United States Patent [19]
Walton

[11] Patent Number: 5,193,488
[45] Date of Patent: Mar. 16, 1993

[54] CAT WASTE ELIMINATION SYSTEM

[76] Inventor: Robert W. Walton, 150 Berryman Avenue, St. Catharines, Ontario, Canada, L2R 3X1

[21] Appl. No.: 793,126

[22] Filed: Nov. 18, 1991

[51] Int. Cl.$^5$ .............................................. A01K 1/01
[52] U.S. Cl. ................................... 119/166; 119/169
[58] Field of Search ............... 119/165, 166, 167, 169, 119/170

[56] References Cited

U.S. PATENT DOCUMENTS

| | | | |
|---|---|---|---|
| 3,386,417 | 6/1968 | Machowski | 119/169 |
| 3,626,899 | 12/1971 | Spellman | 119/169 |
| 3,793,989 | 2/1974 | Clark | 119/165 |
| 4,308,825 | 1/1982 | Stepanian | 119/167 |
| 4,444,148 | 4/1984 | Lander | 119/165 |
| 4,469,046 | 9/1984 | Yananton | 119/169 |
| 4,534,315 | 8/1985 | Sweeney | 119/165 |
| 4,696,257 | 9/1987 | Neary et al. | 119/166 |
| 4,926,794 | 5/1990 | Yamamoto | 119/165 |
| 5,038,721 | 8/1991 | Ouellette et al. | 119/167 |

FOREIGN PATENT DOCUMENTS

| | | | |
|---|---|---|---|
| 3150097 | 7/1988 | Fed. Rep. of Germany | 119/165 |
| 2482416 | 11/1981 | France | 119/165 |
| 8102536 | 12/1982 | Netherlands | 119/166 |

Primary Examiner—John G. Weiss
Attorney, Agent, or Firm—Wallace F. Neyerlin

[57] ABSTRACT

A total system to remove, store and dispose of feline (or other animal) bladder and bowel movements through the introduction of and a complete utilization of many features and sub-systems to provide ways of operating and managing a fully sanitary method of wet and dry feline bladder and bowel excretions. The system encompasses a unique urine "purification by exposure to air process," via aeration. It uses the aerification process by having the urine go through a sand or other porous material in a top tray and then through a pervious bottom of said top tray, thence dropping on a suspended porous aeration tablet or pad. This produces an aerified urine. The process is preferably aided by special chemicals implanted in the aeration table which is multi-layered. This then dries the urine, producing no odor, and provides a complete, disposable, sanitary, odorless system of urine deposits. The bowel movements lodge into the dry porous material for burial by the feline and/or disposal by the cat's owner, thus reducing to negligible any stool odor as there is no element to sustain a wet buried stool, as the sand or other porous material is dry.

14 Claims, 9 Drawing Sheets

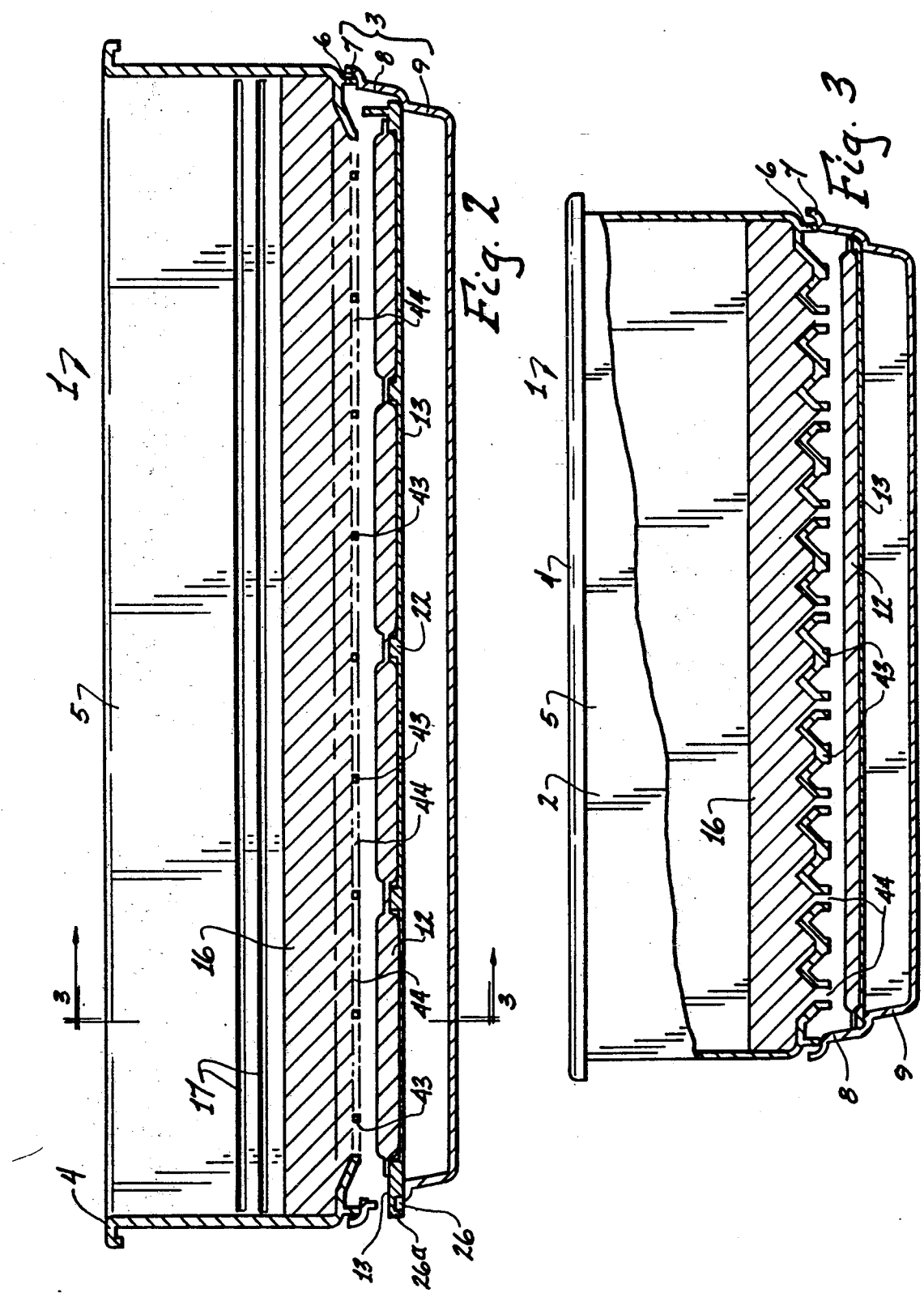

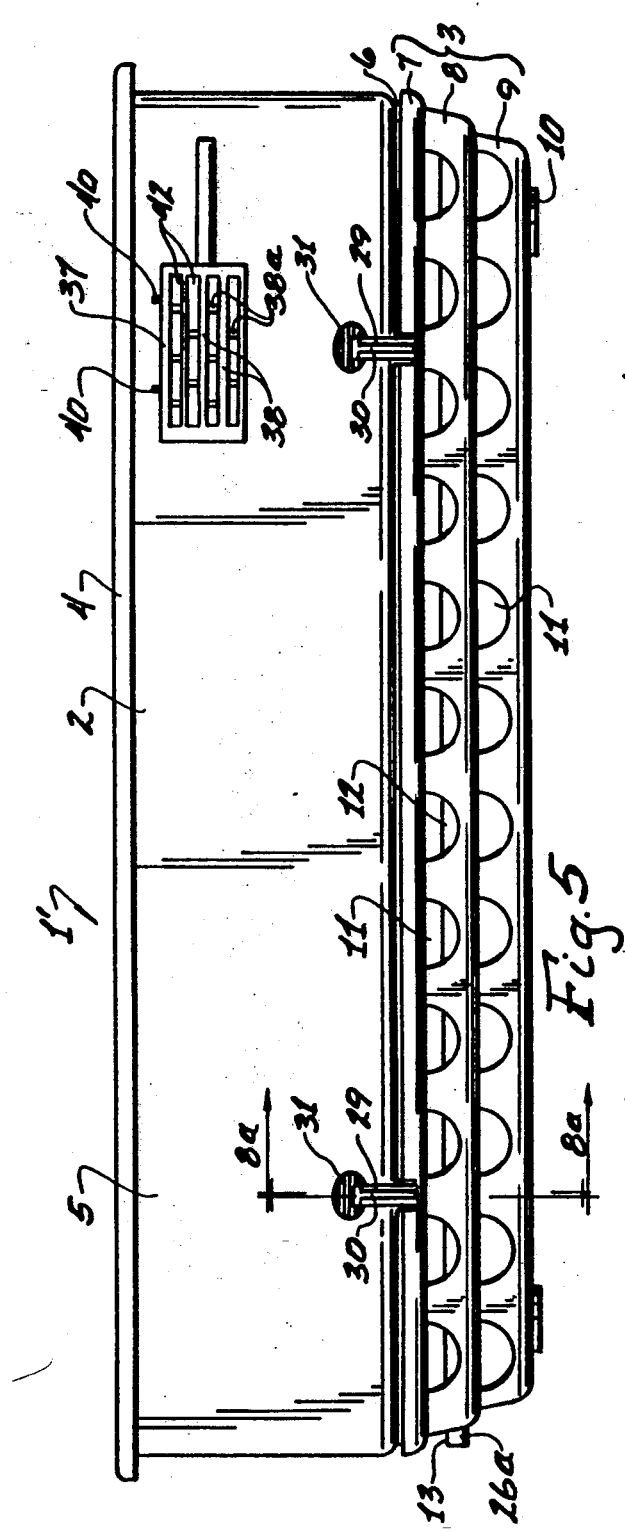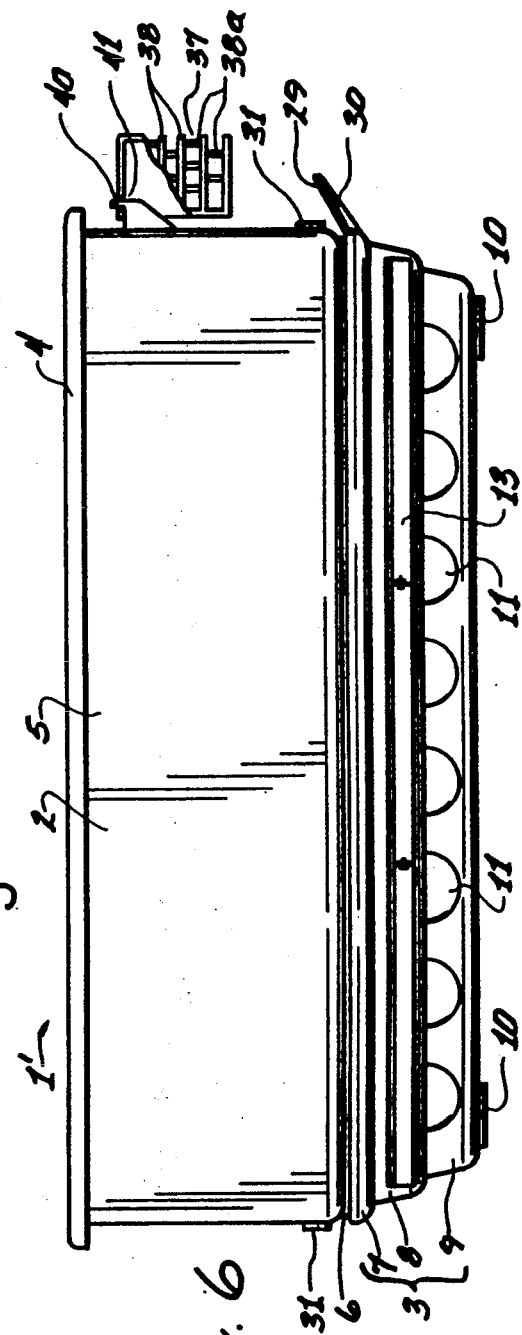

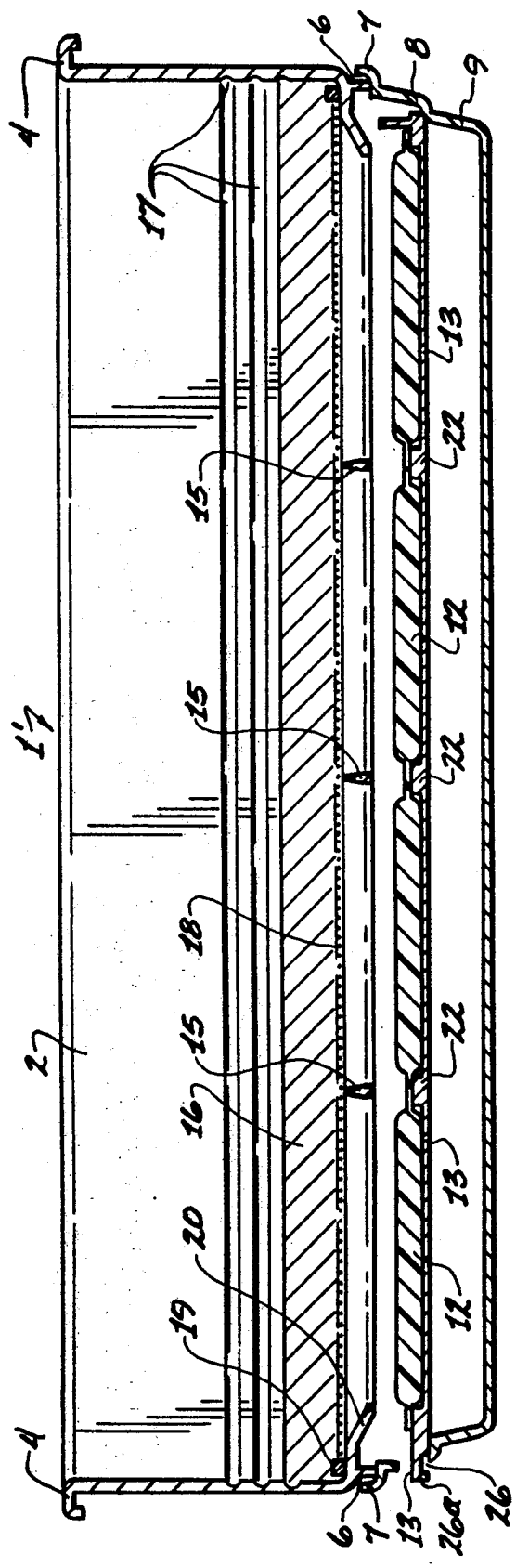
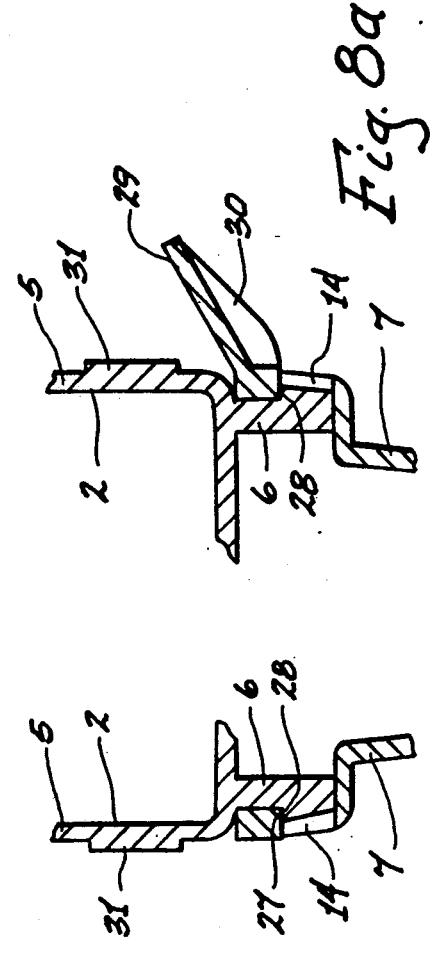

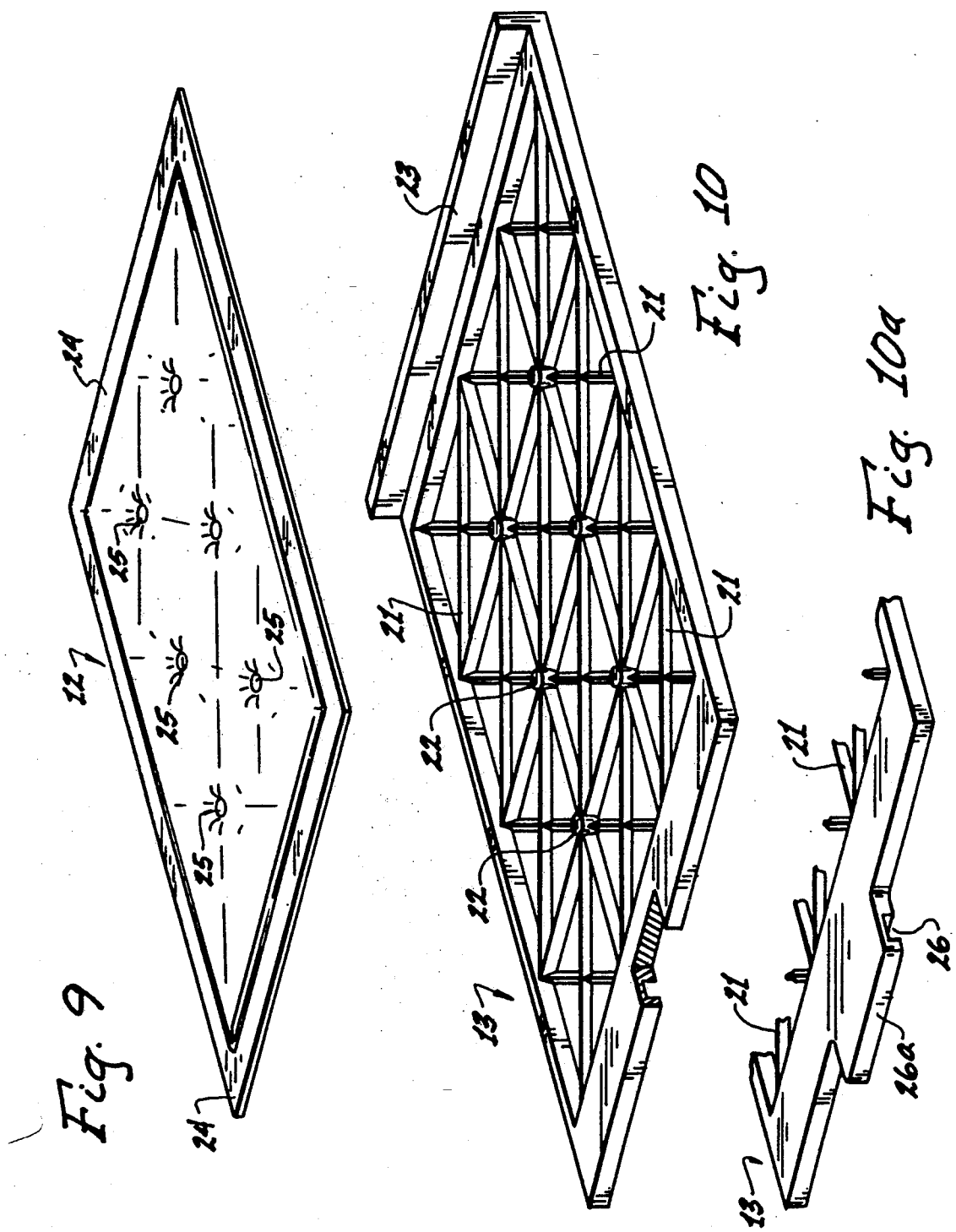

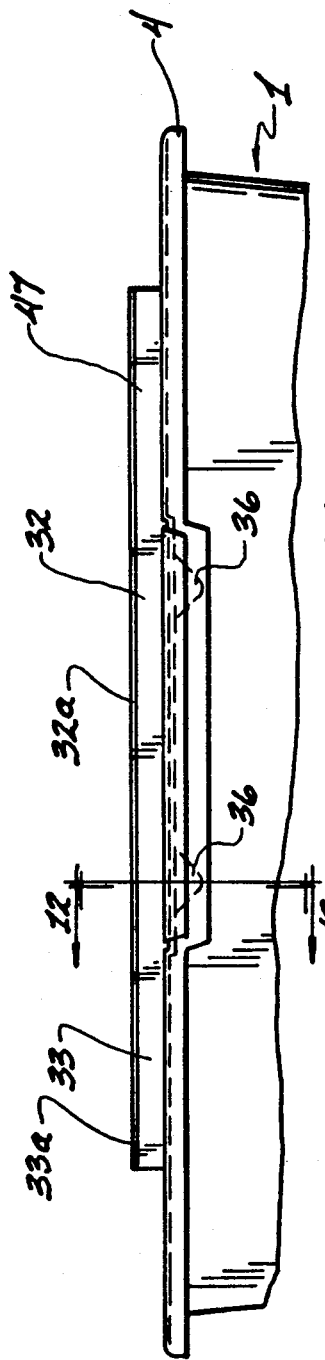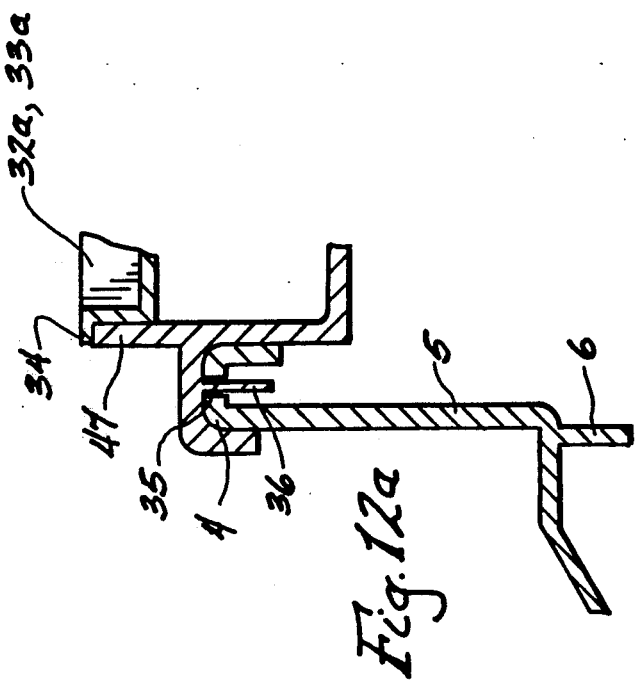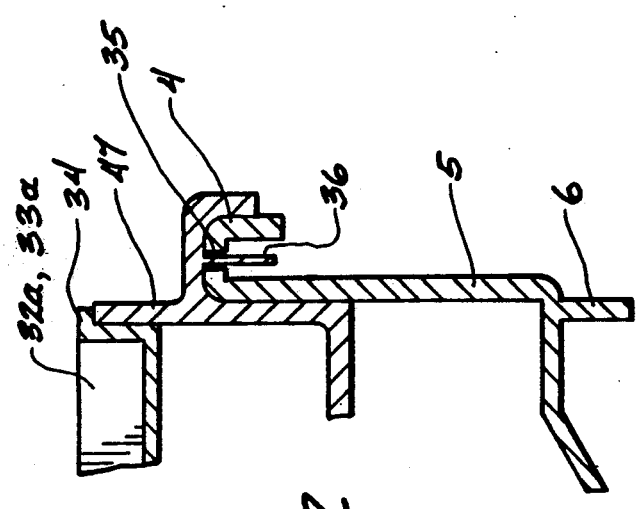

CAT WASTE ELIMINATION SYSTEM

BACKGROUND OF THE INVENTION

1. Field of the Invention

The invention relates to improving and enhancing the devices and practices that are presently generally carried out in disposing of wastes, both solid and liquid, that are deposited by felines in the natural state of their living. These deposits are generally made in devices from make-shift boxes to generally sophisticated but very impractical kitty litter boxes.

In a broader context, the invention relates to novel and improved waste elimination devices and systems for pet animals no matter whether they are felines or other pets such as small dogs or pet skunks, etc. However, the invention specification is described solely with respect to felines, but should not be interpreted as limited thereto.

2. Description of the Prior Art

All presently known systems in one form or another do not address the full problem existing in litter boxes. The vast majority of these boxes require commercially made kitty litter to be placed in the box and to absorb the urine. If the litter is scented there is a slight reduction or masking of the extremely high amount of ammonia generated by stagnant urine permeated into the litter at the bottom of the box. Some attempts have been made in the inventions of other patents to alleviate this situation but none approach even closely the simplicity and cleanliness of the device and system of this application.

Some approach it with a diaper type of disposable material but with a plastic bag on the bottom which acts only to collect the urine.

SUMMARY OF THE INVENTION

The aim of this invention is to provide a complete and absolute dissipation of the urine through aeration by the method of employing a solid, suspended tablet or liner which is designed to collect the urine, which tablet also contains a chemical to instantly or quickly absorb and/or neutralize the urine through a chemical reaction so that no ammonia will appear or be generated or long linger; and in which said method the liner will serve to facilitate the dissipation and evaporation of the urine prior to the liner's next usage.

The liner can be used for one cat for a one week or longer period and then is totally disposable, as it is biodegradable. The litter box design involves two main compartments and a tray that suspends the liner and is removable. The system can be used without kitty litter such as with light sand of appropriate particle size mesh or gravel; and, due to lack of bacteria pick-up, the sand or gravel needs to be replaced only about one/fifth or one/seventh as often as is generally practiced with kitty litter in most other systems or boxes.

Because the upper compartment tray is basically hollow, being only restrained or separated from the lower tray assembly by a pervious bottom of special design (preferred) or by a screen mesh, (preferably made of plastic), there is no build up of urine impacted kitty litter as in other systems as the urine goes directly through the pervious bottom of the upper tray or through the screen and the particulate material on the pervious bottom or on the screen to the liner or tablet suspended in the lower tray assembly where it quickly or instantly is absorbed by or reacts with the chemical(s) in the liner, or tablet. When stools are presented or inserted by the feline into the particulate material of the upper tray compartment, it will subsequently be buried in the non-absorbent particulate material, (preferably not cat litter) which is all that is needed for stool. The stool may be removed as infrequently as once a week or longer because there is little or no odor involved with dry stool, and the stool is dry because it does not sit in urine soaked litter. The urine goes through to the chemically treated, absorbent tablet or liner. This is contrary to the wet, smelly and mushy stools presently to be found in kitty litter boxes.

As can be inferred from the foregoing, this invention is designed for the containment of urine and waste of the feline animal, in an odor free environment, that at the same time provides maximum sanitation and the containment of both urine and stool. This system provides a total of several elements and features that combine to provide a simple method and apparatus of animal waste control along with a reduction of costs while at the same time reducing the necessary maintenance, and also while providing a unique and advanced sanitary cat waste elimination system.

The invention will be further explained and made clearer by reference to the attached drawings.

BRIEF DESCRIPTION OF THE DRAWINGS

FIG. 2 is a side sectional view of the assembly of FIG. 1;

FIG. 3 is a transverse sectional view of the assembly of FIGS. 1 and 2 taken across the cut line 3—3 of FIG. 2;

FIG. 5 is a side view of the assembly of FIG. 4;

FIG. 6 is a front (drawer pull-out end) view of the assembly of FIG. 4;

FIG. 7 is a longitudinal sectional view through the assembly of FIG. 4;

FIGS. 8 and 8a illustrate enlarged partial sectional views of the assembly, (FIG. 8a being taken across line 8a—8a of FIG. 5), showing more details of the locking areas of members of the assembly; and FIG. 8 similar to 8a and also showing details of locking areas and unlocking members of the assembly but on opposite sides of the assembly;

FIG. 9 is a perspective view of the preferred special pad or liner or absorbent tablet used in the assembly;

FIG. 10 is a perspective view of a drawer tray employed in the bottom tray assembly to support the absorbent tablet;

FIG. 10a is a drawing showing a preferred end for the tray of FIG. 10 which supports the absorbent tablet;

FIG. 11 is a partial end view of the assembly, illustrating also a means employed in the top compartment of the assembly for temporary storage of solid waste from the cat, hereinafter referred to as a "Po-Pot";

FIG. 12 is a partial sectional view taken across lines 12—12 of FIG. 11 showing the engagement means between the storage boxes of the Po-Pot of FIG. 11 and the top tray compartment of the assembly when the assembly design contains the Po-Pot within the assembly;

FIG. 12a is analogous to FIG. 12 but illustrating assembly design wherein the Po-Pot is stored on the outside of the main assembly;

DETAILED DESCRIPTION OF THE DRAWINGS AND OF THE PREFERRED EMBODIMENTS

Figure 4:
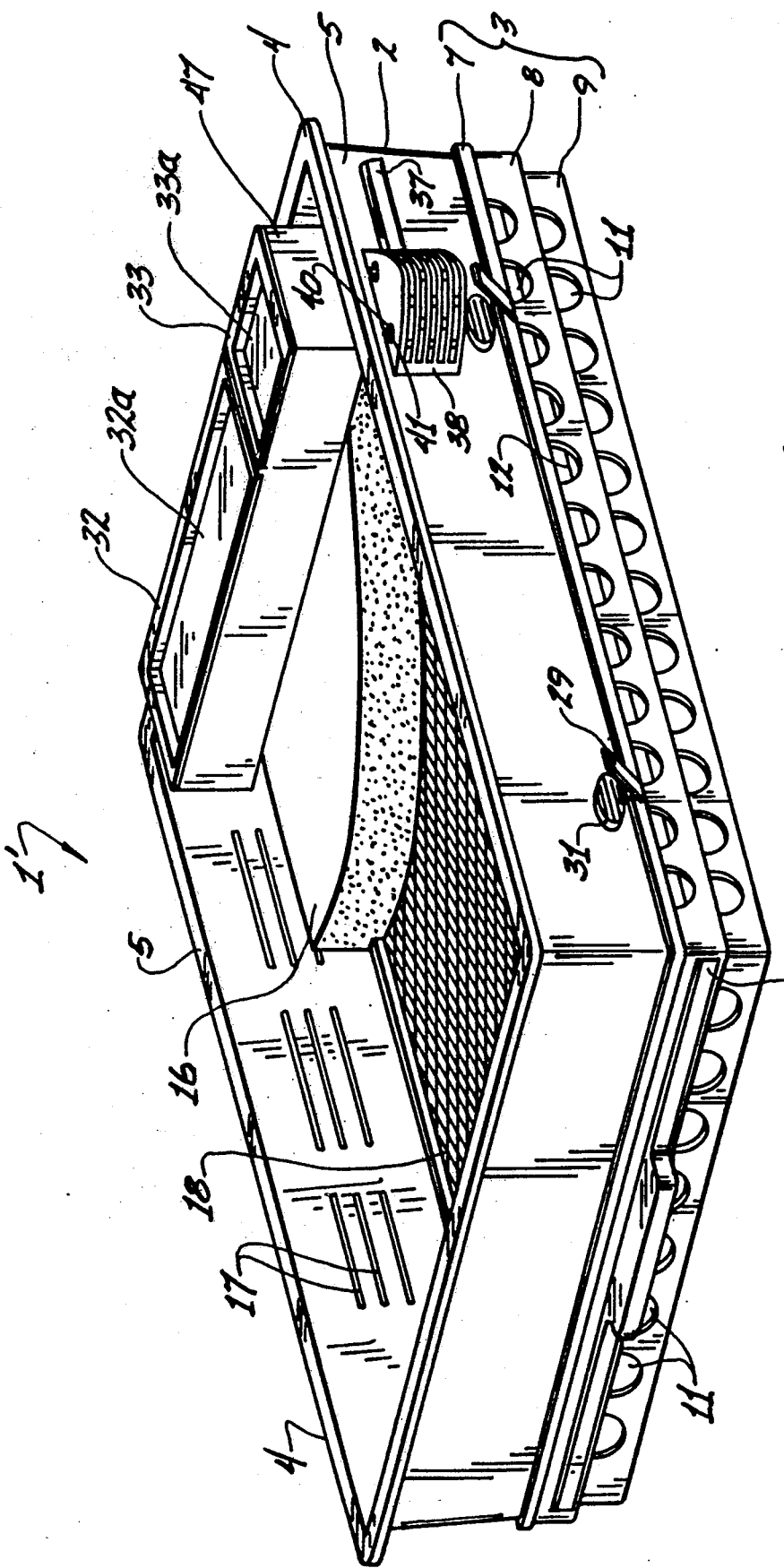
FIG. 4 is a perspective view of another entire assembly, less preferred alternate embodiment.

In the drawings the entire preferred assembly (rectangular in shape preferred) is designated by the numeral 1 (by the numeral 1' in the less preferred embodiment of FIG. 4 et al). The entire assembly includes an upper or top tray compartment 2 and a bottom or lower tray assembly compartment 3. The upper tray compartment possesses a circumferential lip 4 all around its perimeter and a rim or legs 6 which separate the upper tray compartment 2 from the lower tray assembly 3. The upper tray possesses sides 5 around same which sides are almost but not quite vertical. The upper tray or box will typically have dimensions of 14"×20"-22"×5½", and has several unique features; a pervious bottom to allow direct filtration of the cat's urine; a retardent spill ring on the inside to keep the sand or gravel or granular material inside the box; and litter indicator rings or depth markers 17 for the correct balance of particulate material to be put in the box. It preferably also possesses several points of connection on the box for additional accessories. The lower assembly compartment 3 is a holder of the tray 13 that holds the liner pad or tablet 12. This lower assembly compartment 3 has approximately 64 aeration openings or holes 11 in the sides and ends which match up in upper and lower sections of the bottom compartment. The purpose of these holes is to allow the liner or tablet to receive aeration and in so doing to dry the urine out of the liner, allowing the liner to be re-used several times over. This bottom tray assembly compartment is preferably plastic pressure clip fastened to the upper "flow-through" main tray but may be connected to same in any suitable manner.

Figure 1:
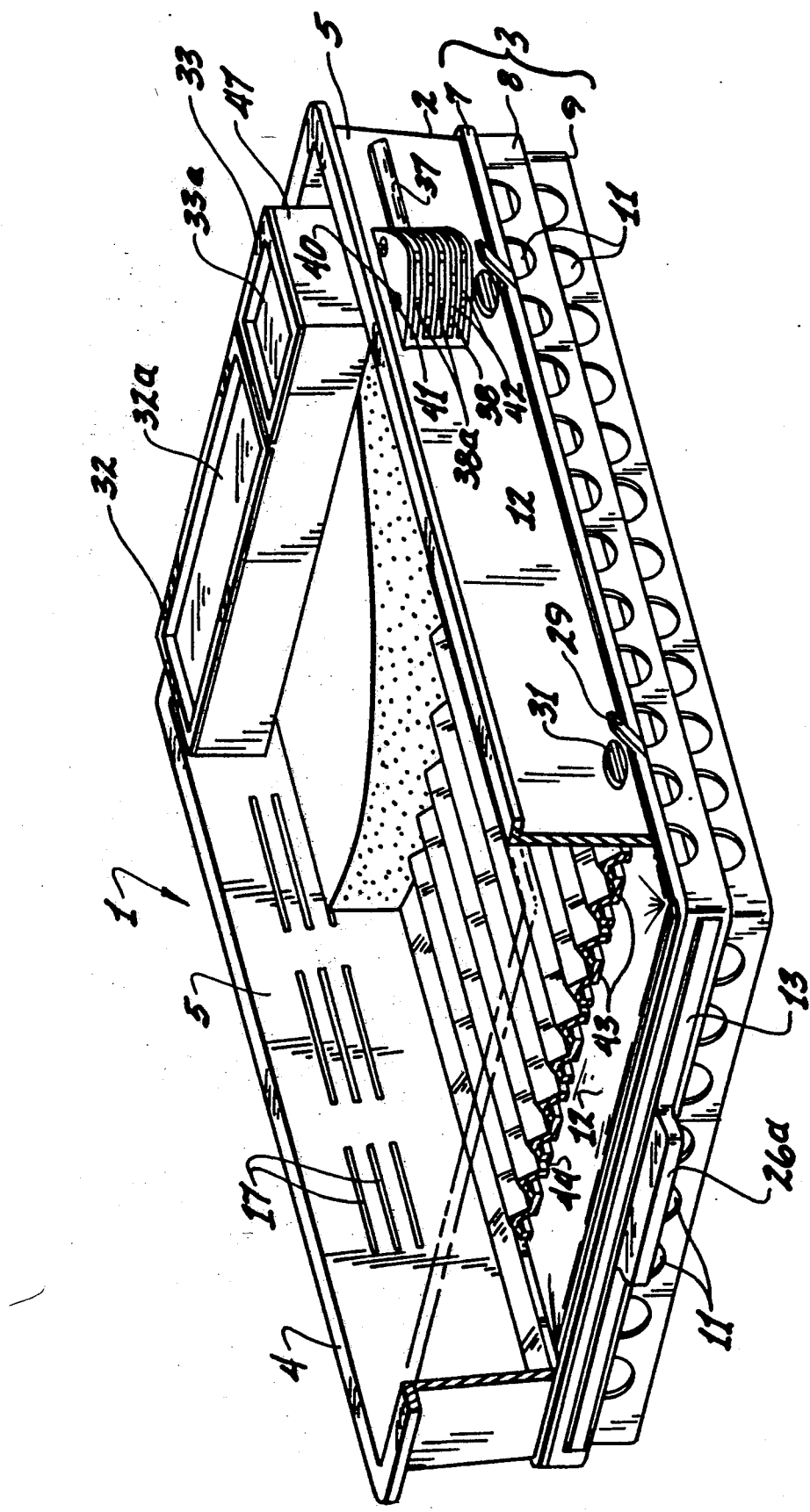
FIG. 1 is a perspective view of the preferred embodiment of the entire assembly of the cat waste elimination system.

FIG. 1 illustrates an embodiment where at the end shown only the lower section 9 of the bottom compartment contains aeration holes 11; whereas at the side shown, both the upper (8) and lower sections (9) of the bottom compartment contain aeration openings which match up vertically. FIG. 1 illustrates 32 such aeration holes, 24 in the side shown and 8 at the end shown, thus indicating that the opposite side and end also possess 32 aeration holes so as to account for the total of 64 aeration openings referred to above. Although aeration openings on each of the sides and each of the ends are preferred for maximum aeration and drying effects, it is also obvious that the invention can be carried out with less preferred results where only one end of the bottom tray assembly possesses such aeration openings.

There is also a drawer-like tray 13 that fits into the bottom assembly compartment 3 which bottom compartment 3 is clipped or fastened to the upper compartment 2 and which tray 13 is for the purpose of supporting the liner tablet 12. This tray 13 is removable for the purpose of simplicity of removing the urine collecting liner tablet. The lower assembly compartment 3 is preferably of only one-piece construction but comprises an upper section 7, a middle section 8 and a bottom section 9, the holes 11 in sections 8 and 9 being in vertical alignment preferably all around the perimeter of the assembly and/or at two sides and one end thereof.

All three parts, top compartment 2, the bottom compartment 3 and the drawer tray 13 make up the main pet waste elimination system construction of this invention, all of which are typically made of rigid plastic. The drawer tray 13 is designed with a lip around the inside to sustain the support of the urine tablet liner 12. The drawer tray also has six small pillars 22 which line up with "buttons" 25 of the liner and which further support the liner 12 so as to allow for a pattern of equal squares on the tablet or liner for support. As aforesaid, the upper section of lower compartment 3 is designated by the numeral 7, the center section by 8 and the bottom section by 9, said lower tray assembly 3 also possessing or being equipped with "elevation" legs or pads 10 on its bottom surface as shown in FIGS. 5 and 6. The sections 8 and 9, and the drawer tray 13 which is slidably contained within center section 8, are structurally coordinated and designed so that the vertically aligned holes 11 provide ample aeration both to the top and bottom of the liner pad; which holes (for ease of manufacturing purposes using commercial plastic forming techniques and procedures which are the most competitive economically,) are typically semi-circular in shape as shown in FIGS. 1, 2 and 3.

As illustrated in several of the Figures, the special pad or tablet 12 employed in the assembly, besides being held within drawer tray 13, is situated horizontally parallel between the aeration holes 11 above the pad in the center section 8 of the bottom tray assembly 3 and the aeration holes 11 below the pad in the bottom section 9 of the lower compartment 3.

The pad 12 is shown in more detail in FIG. 7 and FIG. 9 and the drawer tray 13 that supports the pad is shown in detail in FIG. 10. The sides of upper section 7 of lower compartment 3 possess slots 14 to facilitate entry of locking tabs 27 into same. Locking tabs 27 and 28 are located in the sides of legs 6 of upper tray 2. (See FIG. 8.) As shown in FIG. 8a, the tabs 28 (or 27) may be provided with unlocking levers 29 to facilitate easy disassembly of the trays. Such levers may also be provided with stiffening webs 30 for structural strength and product longevity.

The bottom of top compartment 2 may be reinforced with support straps 15 (FIG. 7) which run longitudinally and transversely, similar to the tray grid 21 illustrated in FIG. 10. Screen 18 and screen frame 19 (FIGS. 7 and 10) span across most of the interior bottom of top compartment 2 except at the slanting drip edge portions 20 around the perimeter of same. Sand and/or gravel and/or kitty litter material 16 is supported by the screen and the amount of same used and/or desired for use is ascertainable by depth marker lines 17 in the interior sides of upper compartment 2. Drawer tray 13 for the absorbent liner or pad or tablet 12 is of intersecting grid design 21 with tray posts 22 and tray stop 23. Pad 12 possesses a pad lip 24 around its perimeter for support on the perimeter of tray 13; and also pad "buttons" 25 for support on tray posts 22. Drawer tray 13 also preferably possesses a handle end 26a with "finger" slots 26 (FIG. 10a) for gripping the tray for periodic removal as desired.

As previously stated, FIGS. 8 and 8a illustrate slots 14 and locking tabs 27 and locking tabs 28 and other locking members such as may be employed in connection with any of the various tray members to enable or facilitate their easy assemblage and/or disassembly, but should not be construed as limiting as to means which may be employed for such functions.

FIG. 9 illustrates the absorbent pad or tablet 12 in the waste elimination system of the present invention. Sides 24 and "buttons" 25 provide for the desired mechanical support of the pad upon tray 13 with its grid design 21 and its posts 22. Tablet 12 is preferably multi-layered and will also preferably have a stiffness of construction so as to substantially support itself upon tray 13 along and across its entire area (typically about twenty inches long and fourteen inches across or wide) for impregnation and receiving of the cat's urine and the tablet's subsequent aeration.

The pad's construction preferably involves five separate layers; a bottom and a top layer, which are holding layers, with three additional layers in between, two being wood pulp for absorption, and the third middle layer containing a chemical retardent to neutralize smell and ammonia. These chemicals are of sufficient quantity to allow for several wettings before they are depleted. The construction of this liner typically involves the high pressure pressing of the outer edge for aproximately ⅜" to cover the circumference of the entire liner. This gives a hard fixed surface to rest on a flanged edge of the drawer tray 13 situated substantially midway horizontally parallel between aerated middle section 8 and the aerated bottom section 9 of the bottom tray assembly 3, thus providing substantial access of air to the liner both from the sides and ends of the assembly and also from above and below the liner. There are also the six additional circled, flattened pad buttons 25 strategically located on the liner to provide solid support atop tray posts 22 for the suspension of the tablet liner atop grid 21 within the liner tray drawer 13 of bottom tray assembly 3.

The thickness involves a high concentration of wood pulp along with a chemical for absorbing and reducing smell and increasing absorption. The preferred construction involves an upper and a lower layer of retentive non-woven material. Some other featured aspects of the liner is its simplicity of use in the drawer tray 13 and its easy removal and replacement (e.g. a five second operation,); its ease of handling and disposal, its complete biodegradeable feature so as not to damage the environment; its ability to function as an absorbant and holding mechanism for the urine; and also, through the aeration process of the invention, its ability to dry between usages and subsequently to be re-usable several times before its disposal.

Upper compartment 2 also preferably possesses user friendly "finger pads" 31 located near the unlocking levers 29 and the stiffening webs 30 to facilitate ease of assembly and disassembly of the compartments 2 and 3 with or from each other.

The entire assembly 1 or 1', in further preferred combination embodiments thereof, also preferably possesses a "Po Pot" 47, i.e. a container for temporary disposition of the cat's bowel movements. The "Po Pot" preferably possesses two chambers 32 and 33, covered by a single lid (not shown) over both chambers, or by two lids 32a and 33a; and preferably also is located within the entire assembly as shown in FIGS. 1 and 4 and FIG. 12; but may also be located on the outside wall of the assembly as illustrated in FIG. 12a. As with other members of the assembly, connections of the Po Pot to the main assembly or upper tray compartment 2 may be accomplished by means of slots 35 and tabs 36, as illustrated in FIGS. 11, 12 and 12a.

Figure 13:
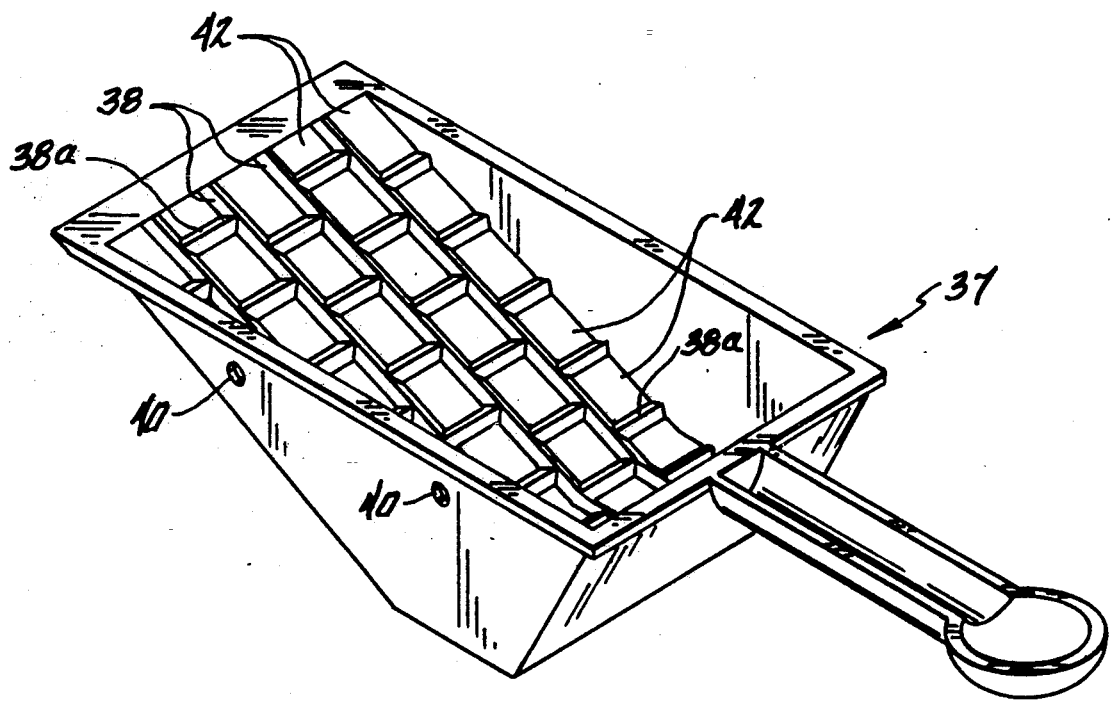
FIG. 13 is a perspective view of a special cleaning scoop employed in the cat waste elimination system of this invention.

The entire assembly preferred embodiment also includes for fecal removal a special scoop 37 (FIG. 13) removably affixed to the outer wall of top tray 2 of the assembly. The outer wall possesses molded hooks or pins 41 for correspondingly fitted and sized holes 40 in the scoop. The bottom of scoop 37 possesses slot like openings 42 separated by longitudinal framing bars 38 and transverse framing bars 38a and teeth 39 as illustrated in detail in FIG. 13, which design permits easy and efficient separation and removal of the fecal material from the granular material 16 contained in the upper compartment 2. Teeth 39 are optional and/or may be located elsewhere on the scoop, such as at its tip.

The aeration of the entire bottom of the feline waste container of the present invention is designed for the express purpose of not only eliminating odor but to dry the urine and in so doing to provide a higher degree of sanitation than any other similar system. The aeration even dries the bottom of the top compartment tray which contains the particulate material that the feline frequently scratches for burial of the fecal waste, thus allowing air to rise through the sand or other granular material contained therein. The system thus allows both top and bottom air movement to be absorbed on the floor of any home by simple drafts of heating, air conditioning or body movement.

As previously indicated, the design of FIG. 1 is a preferred embodiment over that of FIG. 4, although both designs are operative and novel with the present invention.

Figure 14:
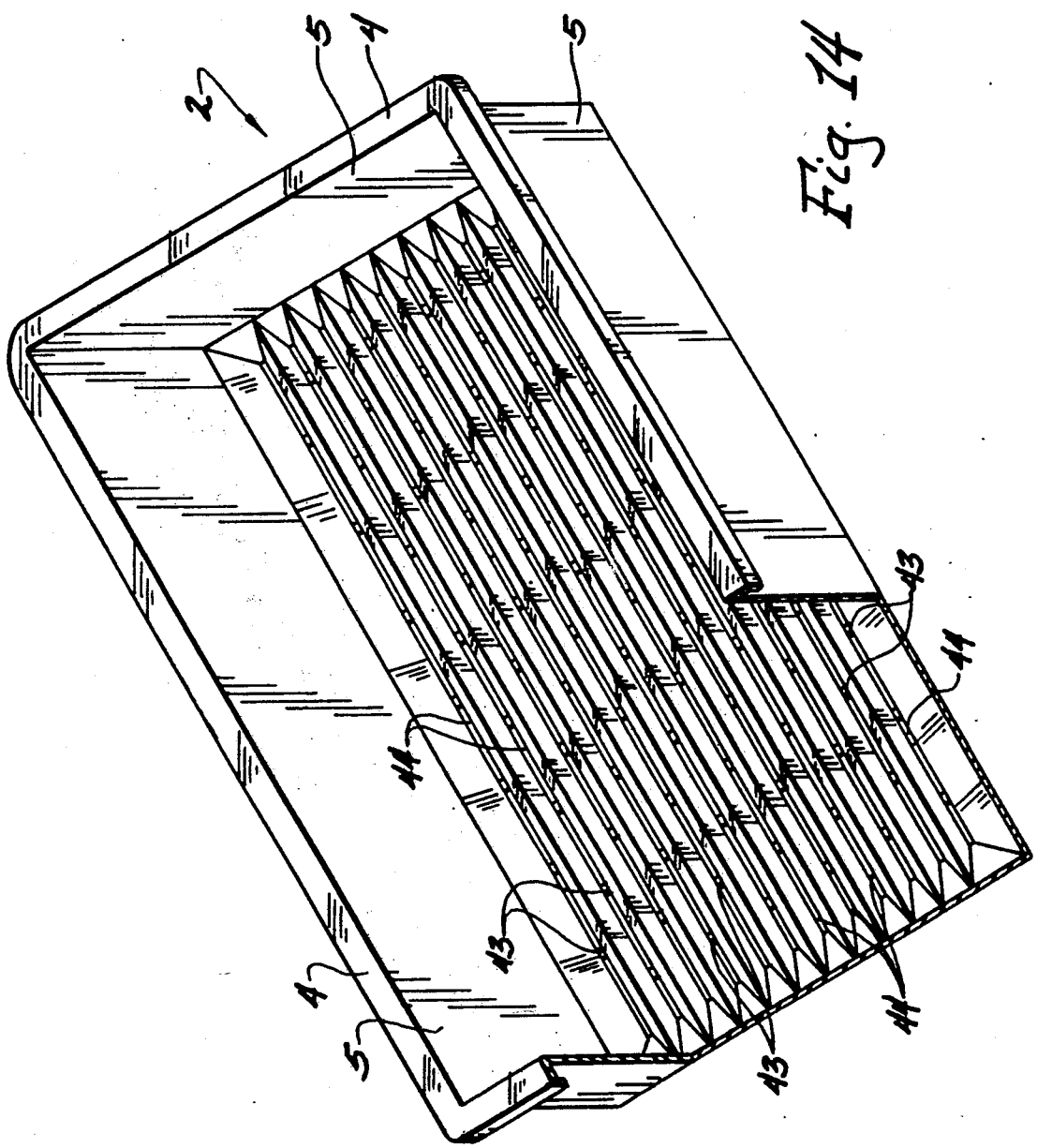
FIG. 14 is a perspective view of the bottom design of the top tray compartment employed in the assembly of FIGS. 1-3.

The bottom of the upper tray compartment of FIG. 1 and FIG. 14 is designed so as to keep a layer of granules covering the escape urine longitudinal slot holes 44 in the valleys of the tray compartment. The bottom of the tray consists of a number of longitudinal V shaped valleys and inverted V-shaped bars joined by bar separators 43. The number of these longitudinal V-shaped valleys and inverted V-shaped bars is variable but typically may be a total of about fourteen of each for a waste assembly system having the dimensions previously referred to. This preferred structure keeps the felines from reaching the bottom of the upper tray compartment through the granules and minimizes the catching of their claws on or in the slot holes 44. Because of this "V" and inverted V configuration of the bottom and the inability of the granular material (of appropriate size so as to provide channeling of the urine through same) the V configuration allows for the granule material to protect the holes from being blocked on the urine's route to the tablet in the lower tray assembly.

FIG. 14 illustrates about 7 to 9 longitudinal slot holes 44 in each of the V-shaped valleys shown in the bottom of the tray. Typically, any such top tray compartment of a waste elimination system having a top tray compartment design of this invention as illustrated in FIGS. 1 and 14 will have at least a set of 60 or more such elongated holes in the bottom thereof.

The system of fecal removal does not have to be exercised as often as is presently done with conventional litter boxes because the deposits are made into dry material and there will therefore be dry fecal matter. This will be removed by the combination scooper/scraper of FIG. 13 with its hollow bottom so as to remove the fecal matter and allow the box burying material, be it litter or sand or other granular material to filter through the elongated holes of the scoop leaving only the fecal matter in the scoop 37 to be disposed of. In this manner, no hands or rubber gloves, or toilet tissue is necessary for the removal of fecal matter. This scooper/scraper will be attached by pins and holes to the main upper body of the system as shown in FIGS. 1 and 4, or by other suitable means such as by a slide insert mechanism.

A second feature of the scooper/scraper, is the scraper aspect which involves turning the scooper over from its original application of fecal removal to use an outer edge of the scoop with teeth 39 as a scraper so as to allow the scraper to remove any dry material that may have adhered to the side or bottom of the upper tray compartment.

The Po-Pot is designed to sit in the end 2½" of the top tray, or on the outside of the tray to give more room for large cats. The size of it is 3½" in width, 11¼" in length, and 3½" in depth. This container is designed as part of the sanitary package so as to allow the instant and easy removal at least once a week—but if desired—less frequently or more frequently.

As shown in FIG. 1, the Po Pot preferably has a second compartment 33 in same, smaller in size than compartment 32. Compartment 33 is for on-site storage of charcoal or baking soda to be used in the fecal storage area 32 to remove and absorb any odor. A key feature is the total air seal between the lid or lids 32a and 33a and the main storage box. This combination makes an air tight storage cabinet and with its maneuverability allows for instant ease and disposal of solid fecal matter.

The foregoing description and embodiments are intended to illustrate the invention without limiting it thereby. It will be understood that various modifications can be made in the invention without departing from the spirit or scope thereof.

I claim:

1. A cat waste elimination system comprising in combination:
    a. a substantially rectangular top tray compartment;
    b. a substantially rectangular bottom tray assembly; and
    c. an aeration tablet interposed horizontally parallel between said top tray compartment and bottom tray assembly and extending longitudinally and transversely therebetween suspended on a slat drawer in the bottom tray assembly;
    said top tray compartment also possessing a set of at least 60 elongated holes in the bottom thereof parallel to and above the aeration tablet for supporting a particulate material in which the cat's waste is deposited and through which holes and particulate material the cat's urine passes for deposit upon and absorption by the aeration tablet;
    and said bottom tray assembly possessing aeration openings in its sides and in at least one of its ends to assist in evaporation of the cat's urine deposited upon and absorbed into the aeration tablet.

2. A cat waste elimination system according to claim 1 wherein the aeration tablet is a laminate absorption material and possesses a harmless chemical substance capable of absorbing or reacting with the cat's urine so as to substantially deodorize it.

3. A cat waste elimination system according to claim 1 including as an integral part a container possessing a chamber for temporary storage of bowel movements from the cat.

4. A cat waste elimination system according to claim 3 wherein the container also includes a chamber for storage of a harmless chemical substance for deodorizing the cat's bowel movements.

5. A cat waste elimination system according to claim 1 including a scoop releasably attached to the top tray compartment, said scoop being for the purpose of separating solid excrement from particulate material in the top tray compartment and said scoop being characterized by possessing elongated openings therein through which the particulate material easily passes but which elongated openings trap and hold the solid excrement for disposal elsewhere.

6. A cat waste elimination system comprising in combination:
    a. a substantially rectangular top tray compartment;
    b. a substantially rectangular bottom tray assembly; and
    c. an aeration tablet interposed horizontally parallel between said top tray compartment and bottom tray assembly and extending longitudinally and transversely therebetween suspended on a slat drawer in the bottom tray assembly;
    said top tray compartment also possessing a screen in the bottom thereof parallel to and above the aeration tablet for supporting a particulate material in which the cat's waste is deposited and through which screen and particulate material the cat's urine passes for deposit upon and absorption by the aeration tablet;
    and said bottom tray assembly possessing aeration openings in its sides and in at least one of its ends to assist in evaporation of the cat's urine deposited upon and absorbed into the aeration tablet.

7. A cat waste elimination system according to claim 2 wherein the aeration tablet is a laminate absorption material and possesses a harmless chemical substance capable of absorbing or reacting with the cat's urine so as to substantially deodorize it.

8. A cat waste elimination system according to claim 6 including as an integral part a container possessing a chamber for temporary storage of bowel movements from the cat.

9. A cat waste elimination system according to claim 8 wherein the container also includes a chamber for storage of a harmless chemical substance for deodorizing the cat's bowel movements.

10. A cat waste elimination system according to claim 6 including a scoop releasably attached to the top tray compartment, said scoop being for the purpose of separating solid excrement from particulate material in the top tray compartment and said scoop being characterized by possessing elongated openings therein through which the particulate material easily passes but which elongated openings trap and hold the solid excrement for disposal elsewhere.

11. In combination a tray compartment and an aerification tablet for use in the top of a cat waste elimination system for the purpose of directing urine through the bottom of the tray compartment onto the aerification tablet, said tray compartment possessing a bottom configuration consisting of a multiplicity of V-shaped valleys and inverted V-shaped hills, the bottom of said valleys possessing a multiplicity of longitudinal holes, said bottom capable of supporting a particulate material in which the cat waste is to be deposited, the longitudinal holes in the bottom valleys being of sufficient number and size to permit passage therethrough of the cat's urine but also being sufficiently limited in size so as to be capable of supporting most or substantially all of the particulate material which is to be placed atop same without permitting passage through the holes of said bottom valleys.

12. A pet animal waste elimination system comprising in combination:
   a. a substantially rectangular top tray compartment;
   b. a substantially rectangular bottom tray assembly; and
   c. an aeration tablet interposed horizontally parallel between said top tray compartment and bottom tray assembly and extending longitudinally and transversely therebetween;

said top tray compartment's bottom being pervious to urine above the aeration tablet but capable of supporting a particulate material in which the animal's waste is deposited and through which pervious bottom and particulate material the animal's urine passes for deposit upon and absorption by the aeration tablet; and said bottom tray assembly possessing aeration openings in its sides and in at least one of its ends to assist in evaporation of the animal's urine deposited upon and absorbed into the aeration tablet.

13. In combination, an aeration tablet having top and bottom surfaces in a cat waste elimination system, said tablet horizontally disposed and suspended in said system and subjected to aeration on both its top and bottom surfaces so as to produce a dry elimination system.

14. The combination of claim 13 wherein said aeration tablet is a laminate absorption material possessing a harmless chemical substance capable of absorbing or reacting with the cat's urine so as to substantially deodorize it.

* * * * *